(12) United States Patent
Lee

(10) Patent No.: US 10,302,464 B2
(45) Date of Patent: May 28, 2019

(54) CONFIGURABLE OPTICAL ENCODER FOR REMOVING A SECOND HARMONIC WAVE AND A FOURTH HARMONIC WAVE WITH SPECIFIC INTERVALS

(71) Applicant: RS Automation Co., Ltd., Pyeongtaek-si (KR)

(72) Inventor: Sang Hoon Lee, Seongnam-si (KR)

(73) Assignee: RS AUTOMATION CO., LTD., Gyeonggi-Do (KR)

(*) Notice: Subject to any disclaimer, the term of this patent is extended or adjusted under 35 U.S.C. 154(b) by 521 days.

(21) Appl. No.: 14/289,808

(22) Filed: May 29, 2014

(65) Prior Publication Data

US 2014/0326862 A1    Nov. 6, 2014

Related U.S. Application Data

(63) Continuation of application No. PCT/KR2012/001085, filed on Feb. 14, 2012.

(30) Foreign Application Priority Data

Feb. 2, 2012   (KR) .................. 10-2012-0010598

(51) Int. Cl.
*G01D 5/347*     (2006.01)

(52) U.S. Cl.
CPC ....... *G01D 5/3473* (2013.01); *G01D 5/34715* (2013.01)

(58) Field of Classification Search
CPC ... G01D 5/3473; G01D 5/34715; G01D 5/347
USPC .............. 250/231.13, 231.1, 231.14, 231.16, 250/231.18, 237 G, 221, 239; 341/11, 13, 341/14; 33/1 PT, 1 M, 1 N; 356/614, 356/615, 616
See application file for complete search history.

(56) References Cited

U.S. PATENT DOCUMENTS

| | | | | |
|---|---|---|---|---|
| 5,068,530 A | * | 11/1991 | Ieki | .......... G01D 5/38 250/231.16 |
| 5,889,280 A | * | 3/1999 | Matsuura | ................ H03M 1/30 250/231.16 |
| 6,707,178 B2 | * | 3/2004 | Sakamoto | .............. H02K 37/04 310/156.38 |
| 7,485,845 B2 | * | 2/2009 | Yaku | .................. G01D 5/34746 250/231.13 |

(Continued)

FOREIGN PATENT DOCUMENTS

| | | |
|---|---|---|
| JP | 8-145724 A | 6/1996 |
| JP | 2539269 B2 | 10/1996 |

(Continued)

OTHER PUBLICATIONS

International Search Report dated Feb. 27, 2013 in parent International Application No. PCT/KR2012/001085 (5 pages, in Korean, with complete English translation).

*Primary Examiner* — Que Tan Le
*Assistant Examiner* — Jennifer D Bennett
(74) *Attorney, Agent, or Firm* — The PL Law Group, PLLC

(57) ABSTRACT

The optical encoder according to the present disclosure includes a light receiving part formed with a plurality of first patterns, and a scale formed with second patterns and moving relative to the light receiving part, where at least one of the first and second patterns is aligned at a same interval to remove harmonic waves.

14 Claims, 15 Drawing Sheets

(56) References Cited

U.S. PATENT DOCUMENTS

2003/0047673 A1* 3/2003 Thorburn ............... G01D 5/366
250/231.13

FOREIGN PATENT DOCUMENTS

| JP | 9-196705 A | 7/1997 |
|----|------------|--------|
| KR | 10-2011-0013311 A | 2/2011 |

* cited by examiner

CONFIGURABLE OPTICAL ENCODER FOR REMOVING A SECOND HARMONIC WAVE AND A FOURTH HARMONIC WAVE WITH SPECIFIC INTERVALS

CROSS-REFERENCE TO RELATED APPLICATION(S)

This application is a continuation of International Application No. PCT/KR2012/001085 filed on Feb. 14, 2012, which claims the benefit of Korean Patent Application No. 10-2012-0010598, filed on Feb. 2, 2012, the entire disclosures of which are incorporated herein by reference for all purposes.

BACKGROUND OF THE INVENTION

Field of the Invention

The present disclosure relates to an optical encoder, and more particularly to an optical encoder configured to remove harmonics.

Description of Related Art

Optical encoders are used in a wide variety of environments to determine movement and/or a position of an object with respect to some reference.

One common technique for optical encoders uses an optical sensor and an encoder pattern. The optical sensor focuses on a surface of the encoder pattern. As the sensor moves with respect to the encoder pattern, or the encoder pattern moves with respect to the sensor, the sensor reads a pattern of light either transmitted therethrough, or reflected by, the encoder pattern to detect the motion or position.

Korea Laid-Open Patent No.: 2007-0026137 discloses a conventional optical encoder configured to detect an index channel free from means for detecting an index that is a reference for position determination. However, the Korea Laid-Open Patent No.: 2007-0026137 fails to propose a solution for removing harmonics included in an electric signal corresponding to the optical pattern for detecting a position of an object in a high precision, although the solution is highly preferable.

SUMMARY OF THE INVENTION

The present disclosure is disclosed to provide an optical encoder configured to remove harmonics with reliability.

Technical problems to be solved by the present disclosure are not restricted to the above-mentioned, and any other technical problems not mentioned so far will be clearly appreciated from the following description by skilled in the art.

In one general aspect of the present disclosure, there is provided an optical encoder, the optical encoder comprising: first and second patterns respectively formed on a scale relatively moving with respect to a light receiving part and a light transmission part, wherein at least one of the first and second patterns is aligned at a same interval where harmonic wave is removed.

At this time, an interval of the first pattern may be smaller than a width of the first pattern.

To be more specific, each of the first patterns may be aligned at an interval in which the width of the first pattern is divided by 6 in order to remove $2^{nd}$, $3^{rd}$, $4^{th}$, $6^{th}$ and $12^{th}$ harmonic waves, when the second pattern formed on the scale has a same width as that of the first pattern and is aligned at an interval same as the width.

Advantageous Effects

As discussed above, the optical encoder according to present disclosure has an advantageous effect in that each pattern is aligned at a same interval in which harmonic waves are removed to reliably remove the harmonic wave.

Another advantageous effect is that the manufacturing process becomes easy due to each pattern being aligned at a same interval to thereby reduce a manufacturing error, whereby the harmonic removing function caused by the manufacturing error can be prevented from being decreased.

Still another advantageous effect is that a pattern is aligned at an interval narrower than width of pattern to allowing using a light receiving area efficiently.

Still further advantageous effect is that several signals are combined for use to thereby reduce the influence of white noise included in the signal.

DETAILED DESCRIPTION OF THE INVENTION

Various exemplary embodiments will be described more fully hereinafter with reference to the accompanying drawings, in which some exemplary embodiments are shown. The present inventive concept may, however, be embodied in many different forms and should not be construed as limited to the example embodiments set forth herein. Rather, the described aspect is intended to embrace all such alterations, modifications, and variations that fall within the scope and novel idea of the present disclosure.

Now, an exemplary embodiment of the present disclosure will be described in detail with reference to the accompanying drawings.

Figure 1:
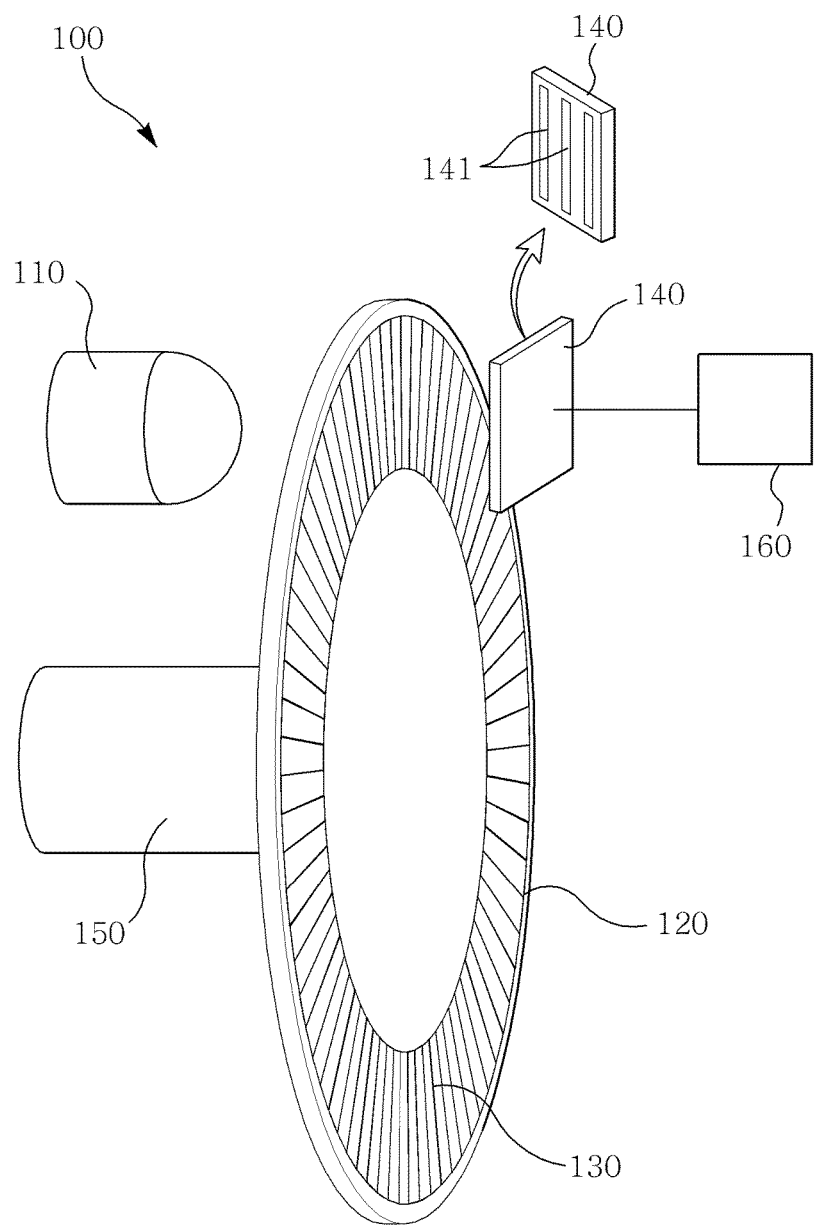
FIG. 1 is a schematic view illustrating an optical encoder according to the present disclosure.

FIG. 1 is a schematic view illustrating an optical encoder according to the present disclosure.

Referring to FIG. 1, an optical encoder (100) according to the present invention includes a light source (110), a scale (120), a light receiving part (140) and a computation part (160) connected to the light receiving part (140). The light source (110) may be an LED (Light Emitting Diode) or an LD (Laser Diode), for example. The scale (120) is interposed between the light source (110) and the light receiving part (140) and may be attached to a rotation shaft (150) which is an object of measurement.

The rotation shaft may be attached with a light receiving part instead of scale, because the scale and the light receiving part move relatively. A second pattern (130) configured to modulate light flux from the light source (110) may be provided along a circumference. The second pattern (130) is patterned in response to a rotation angle of the rotation shaft (150). Although the scale (120) in FIG. 1 is illustrated as a disc-shaped scale adequate for the rotation shaft, the present disclosure is not limited thereto, and the scale may be a plate-shaped scale applicable to a linear encoder.

The light receiving part (140) may receive the light flux from the second pattern (130) and convert the light flux to an electric signal for output to the computation part (160). To be more specific, the light receiving part (140) may include one or more light receiving elements formed in a first pattern (141). At this time, when the light flux is received, each light receiving part may generate an electric signal and output the electric signal to the computation part. The computation part (160) may output by computing the scale, that is, by computing a rotation angle or a rotation position of the rotation shaft (150).

Although the optical encoder (100) in FIG. 1 has explained and illustrated a case of a rotary encoder, the present disclosure is not limited thereto, and a linear encoder may be applicable to the present disclosure. Furthermore, although FIG. 1 has explained and illustrated detection of light flux of the light source (110) that has penetrated the pattern (130), the present disclosure is not limited thereto, the present disclosure may be configured to detect reflected light by the light source (110).

Figure 2:
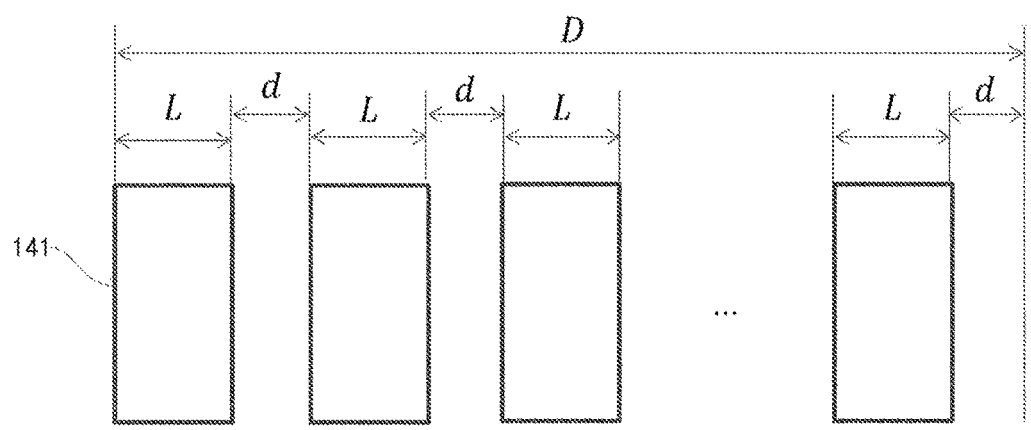
FIG. 2 is a schematic view illustrating an aligned status of patterns in an optical encoder according to an exemplary embodiment of the present disclosure.

FIG. 2 is a schematic view illustrating an aligned status of patterns in an optical encoder according to an exemplary embodiment of the present disclosure.

The optical encoder illustrated in FIG. 2 may include a light receiving part (140) and first and second patterns each formed on the scale (120) moving relative to the light receiving part (140). That is, when the first pattern is formed on the light receiving part, the scale may be formed on the second pattern, and when the second pattern is formed on the light receiving part, the first pattern may be formed on the scale. At this time, any one of the first and second patterns may be aligned at a same interval for removing harmonics.

Changes in width and interval of each pattern can remove the harmonics by adjusting patterns formed on the light receiving part or the scale. However, in this configuration, the width and interval of each pattern must be accurately processed and problem is that it is difficult to reliably process the patterns. In order to solve the problem, each interval and width of the patterns is identically formed, where each interval of pattern alone is manipulated to remove the harmonics.

At this time, the meaning of each interval and width of the patterns being equal or identical is that when a plurality of first patterns is aligned, for example, each width and aligned patterns is same, and each interval of aligned patterns is same. However, it does not mean that an interval among the first patterns is same as an interval among the second pattern.

Now, referring to FIG. 2 illustrating the plurality of first patterns (141) aligned on the light receiving part, a width 'D' and an interval 'd' of the first patterns (141) are same. At this time, the interval 'd' may be adequately adjusted to remove the harmonics. Likewise, when an interval of the second patterns (130) is made to be same, the interval may be adequately adjusted to remove the harmonics. At this time, the adequate interval may be determined within a scope smaller than the width of the second pattern.

Furthermore, the width of the first pattern may match the width of the second pattern. At this time, the first patterns may be aligned at a same interval, and the second patterns may be also aligned at a same interval. However, an alignment interval of the first patterns and an alignment interval of the second patterns may be mutually different.

The first and second patterns may be formed in the following manner in order to obtain a periodic signal such as sinusoidal wave having mutually different phase differences from the light receiving part: That is, it is assumed that the first patterns are formed on the light receiving part each at a same interval, and the second patterns are formed on the scale each at a same interval. At this time, the width of the first patterns is same as the width of the second patterns, and an aligned interval of the second patterns is same as the width of the first patterns or the width of the second patterns.

At this time, an interval of the first patterns being aligned is an interval from which the harmonics are removed, and may be smaller than the width of the first pattern or the width of the second pattern, for example. In this case, the optical area use efficiency and harmonic removal effect may be maximized.

The pattern formed on the scale may be processed in a same rectangular shape having a same width and length to allow a light penetration area and a light non-penetration area to be identical in case of linear encoder. In case of rotary encoder, the pattern formed on the scale may be processed in a same trapezoidal shape to allow a light penetration area and a light non-penetration area to be identical along a periphery.

Although the following description has described and illustrated a case where the light receiving part is formed on the first pattern, and the second pattern having the same width as that of the first pattern is formed on the scale with the same interval as that of the first pattern for convenience sake, the present disclosure is not limited thereto.

The width 'd.' of the first pattern (141) selected from removal of harmonics is preferably a value in which the width 'L' of the first pattern is divided by N (L/N) (N is a natural number more than 2). At this time, the number 'M' of the first pattern may be at least 2N. The reason of aligning the first pattern to satisfy the above requirement is to allow the first pattern having the same width 'L' is made to be distanced as much as 'd' to have at least repeated alignment of 'M', where, in case of N=2, that is, the interval of the first pattern is L/2 is illustrated in FIG. 3.

Figure 3:
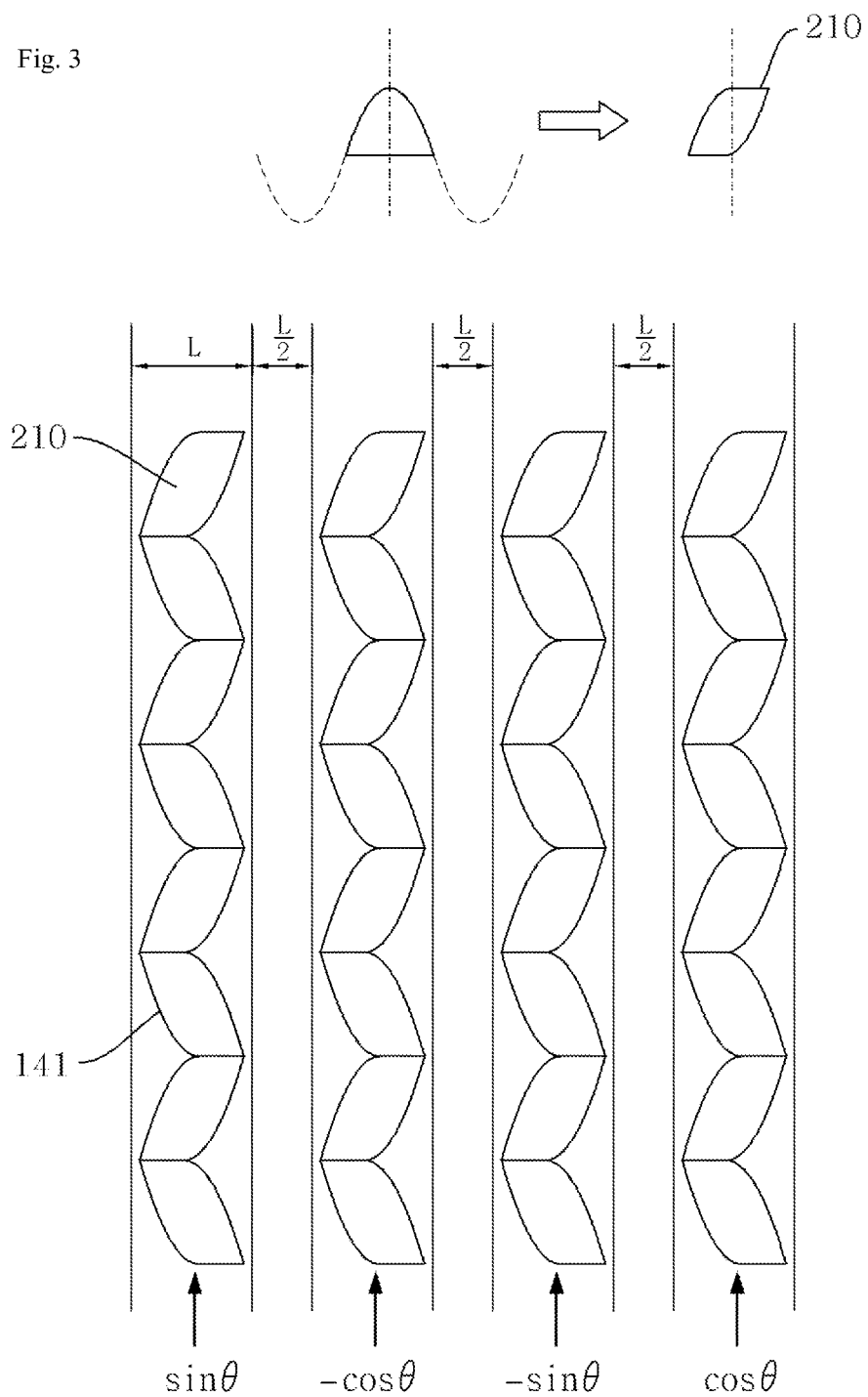
FIG. 3 is a schematic view illustrating an aligned status of patterns in an optical encoder according to another exemplary embodiment of the present disclosure.

FIG. 3 is a schematic view illustrating an aligned status of patterns in an optical encoder according to another exemplary embodiment of the present disclosure.

In the above exemplary embodiment, the removal of harmonics is determined by interval between the first patterns, and has nothing to do with the shape of the first pattern. Thus, the first pattern may take various shapes including a rectangle and the like. However, when a plurality of unit patterns (210) is vertically and continuously aligned as in FIG. 3, an electric signal of sinusoidal wave shape can be reliably obtained.

The unit pattern (210) has a shape of horizontal half being vertically reversed among the outlines of the sinusoidal wave shape, where the sinusoidal wave shape is one of positive sinusoidal wave shape and negative sinusoidal wave shape based on an imaginary horizontal axis. Furthermore, a center of vertical reversion is a ½ point of a height in the positive or negative sinusoidal wave shape. The first pattern (141) of FIG. 3 may be formed when the unit pattern thus formed is horizontally reversed and vertically and continuously aligned.

A sinusoidal wave may be outputted when a sinusoidal wave shape pattern before the unit pattern of FIG. 3 is integrated. However, when the pattern before the unit pattern is vertically and continuously aligned, each connection part (211) of the pattern may be formed with a pointed part or a deep trough. The pointed part and/or deep trough are difficult to be accurately processed, whereby there is a high probability of generating a manufacturing error. Due to this problem, an error may be generated on the electric signal of sinusoidal wave shape. To solve this problem, it is preferable not form the pointed part or a deep trough on the connection part (211) of the pattern, for which it is better to use the aforementioned unit pattern.

When the first pattern is aligned at a half interval of the first pattern width in FIG. 3, one period is completed on a base of first pattern 2N=4. When the first pattern of L width generates a $\pi$ period signal, and when a phase of the first pattern at the extreme left side is $\sin \theta$, remaining three first patterns may sequentially have phases of $-\cos \theta$, $-\sin \theta$ and $\cos \theta$. When four signals of $\sin \theta$, $-\cos \theta$, $-\sin \theta$ and $\cos \theta$ are acquired, an angle can be calculated by signal processing algorithm of the computation part.

An original signal obtained by each first pattern may include a periodic error ($\theta$) and white noise $n_i$ (i is a natural number of 1 to 4). In consideration of the inclusion of periodic error ($\theta$) and white noise $n_i$, a signal outputted from each first pattern may be expressed by in the order of the following equations.

$A \sin\theta + v_{off} + e(\theta) + n_1$ $A \sin(\theta+\pi/2) + v_{off} + e(\theta+3\pi/2) + n_2 = -A \cos\theta + v_{off} + e(\theta+\pi/2) + n_2$ $A \sin(\theta+\pi/2+\pi/2) + v_{off} + e(\theta+\pi/2+\pi/2) + n_3 = -A \sin\theta + v_{off} + e(\theta+\pi) + n_3$ $A \sin(\theta+3\pi/2+3\pi/2+3\pi/2) + v_{off} + e(\theta+3\pi/2+3\pi/2+\pi/2) + n_4 = A \cos\theta + v_{off} + e(\theta+\pi/2) + n_4$ where, when an output signal of the $1^{st}$ first pattern and an output signal of the $3^{rd}$ first signal are deducted and divided by 2, the following equation 1 may be obtained.

$$A\sin\theta + \frac{e(\theta) - e(\theta+\pi)}{2} + \frac{n_1 - n_3}{2} \qquad \text{[Equation 1]}$$

where, $(e(\theta)-e(\theta+\pi))$ means that the $2^{nd}$ harmonic component $e(\theta+\pi)$ is removed from the periodic error $e(\theta)$ included in the original signal. Thus, DC error $V_{off}$ and $2^{nd}$ harmonic component are removed by the above computation. Furthermore, an unexpected periodic error having a period as that of $2^{nd}$ harmonic wave is also removed by the above computation process. Furthermore, in case of white noise, the standard deviation can be reduced by $$\frac{1}{\sqrt{2}}$$

times.

When an output signal of the $4^{th}$ first pattern and an output signal of $2^{nd}$ first pattern are deducted and divided by 2, the following equation 2 may be obtained.

$$A\cos\theta + \frac{e\left(\theta+\frac{\pi}{2}\right) - e\left(\theta+\frac{3\pi}{2}\right)}{2} + \frac{n_4 - n_2}{2} \qquad \text{[Equation 2]}$$

where, $e(\theta+\pi/2)-e(\theta+3\pi/2)$ in the equation 2 means that the $2^{nd}$ harmonic component $e(\theta+3\pi/2)$ is removed from the periodic error $e(\theta+\pi/2)$ included in the original signal.

Thus, DC error $V_{off}$ and $2^{nd}$ harmonic component are removed by the above computation, and white noise can be reduced. At this time, the computation of deduction and division by 2 may be performed by the computation part (160).

The removal of $2^{nd}$ harmonic wave is realized by alignment of each first pattern at L/2 interval irrespective to the first pattern shape. The computation part (160) calculates A $\sin \theta$ 및 A $\cos \theta$ using the first and second equations 1 and 2 where the $2^{nd}$ harmonic wave component is removed and white noise is reduced, and a relative movement amount (distance or angle) $\theta$ and amplitude A can be calculated by re-process of the same. The $\theta$ and A thus obtained was calculated by input of signal removed of the $2^{nd}$ harmonic wave such that a result of no influence by the $2^{nd}$ harmonic wave can be provided.

Figure 4:
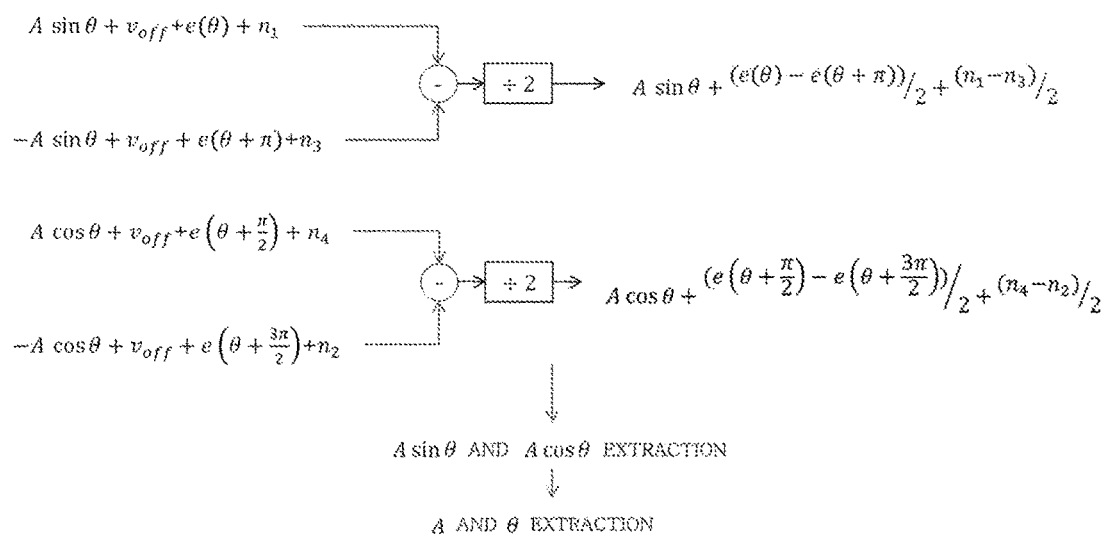
FIG. 4 is a schematic view illustrating a computation process of removing harmonics according to an exemplary embodiment of the present disclosure.

The method of removing the $2^{nd}$ harmonic wave was discussed in the above description, where it can be noted that the $2^{nd}$ harmonic wave can be removed by making each first pattern at a same L/2 interval and adding a computation part that performs a simple computation. The processing thus discussed is illustrated in FIG. 4.

Figure 5:
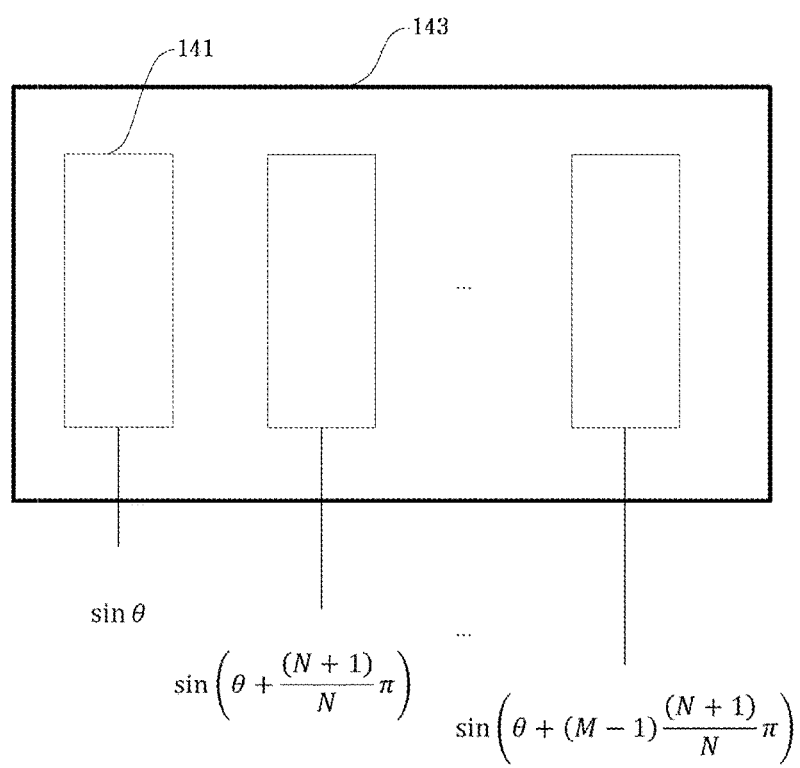
FIG. 5 is a schematic view illustrating a phase of a first pattern in an optical encoder according to the present disclosure.

FIG. 5 is a schematic view illustrating a phase of a first pattern in an optical encoder according to the present disclosure, where each phase of the first pattern may be expressed by the following equation 3 when M number of first patterns (141) is formed.

$$\sin\left(\theta + (k-1)\frac{(N+1)}{N}\pi\right) \quad \text{[Equation 3]}$$

where, k is a natural number of 1 to M.

Figure 6:
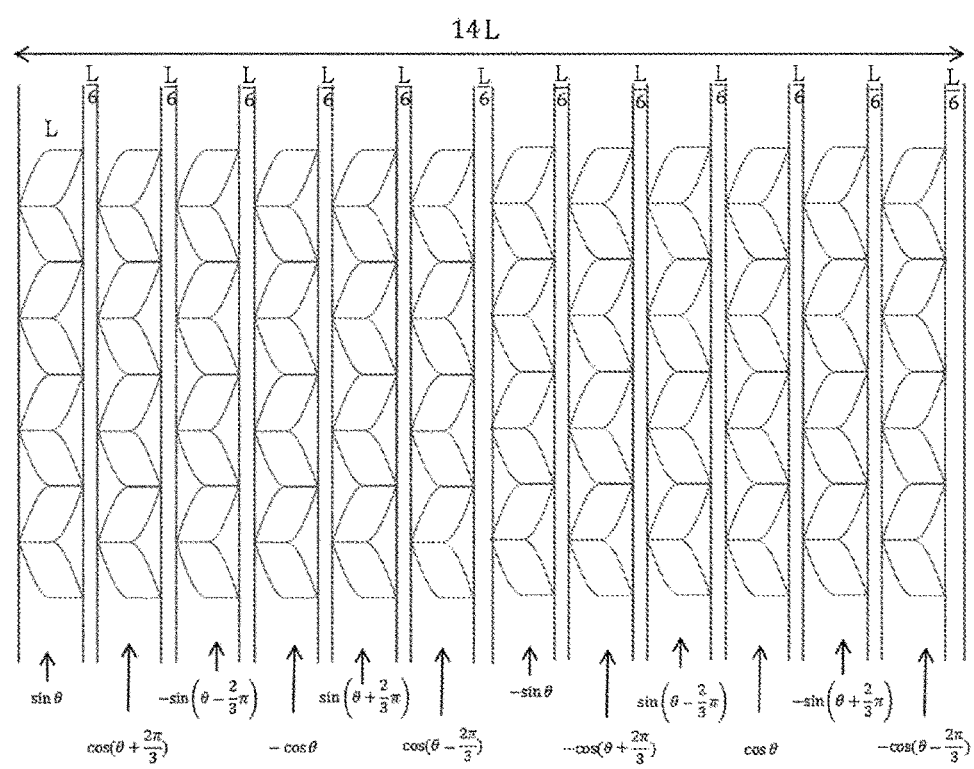
FIG. 6 is a schematic view illustrating a phase of a first pattern in an optical encoder according to an exemplary embodiment of the present disclosure.

When the first pattern is aligned at L/6 (=L/N) as in FIG. 6, N=6 and M=2N=12. Furthermore, D=12(L+L/6)=14L.

When this is inserted into the Equation 3, the phases of first pattern aligned from the left side may be expressed by the following:

$\sin\theta$, $\sin(\theta+7\pi/6)$, $\sin(\theta+7\pi/3)$, $\sin(\theta+7\pi/2)$, ..., $\sin(\theta+77\pi/6)$, which is illustrated in FIG. 6 where factors subsequent to θ are made to be 0 or 2π/3 using the trigonometric functions.

$k=1$, $\sin\theta$ $k=2$, $\sin(\theta+7\pi/6)=\sin(\theta+4\pi/6+3\pi/6)=\cos(\theta+2\pi/3)$ $k=3$, $\sin(\theta+14\pi/6)=\sin(\theta+12\pi/6+2\pi/6)=\sin(\theta-2\pi/3+\pi)=-\sin(\theta-2\pi/3)$ $k=4$, $\sin(\theta+21\pi/6)=\sin(\theta+24\pi/6-3\pi/6)=\sin(\theta-\pi/2)=-\cos\theta$ $k=5$, $\sin(\theta+28\pi/6)=\sin(\theta+24\pi/6+4\pi/6)=\sin(\theta+2\pi/3)$ $k=6$, $\sin(\theta+35\pi/6)=\sin(\theta+36\pi/6-\pi/6)=\sin(\theta+\pi/2-2\pi/3)=\cos(\theta-2\pi/3)$ $k=7$, $\sin(\theta+42\pi/6)=\sin(\theta+48\pi/6-\pi)=\sin(\theta-\pi)=-\sin\theta$ $k=8$, $\sin(\theta+49\pi/6)=\sin(\theta+48\pi/6+\pi/6)=\sin(\theta-\pi/2+2\pi/3)=-\cos(\theta+2\pi/3)$ $k=9$, $\sin(\theta+56\pi/6)=\sin(\theta+60\pi/6-4\pi/6)=\sin(\theta-2\pi/3)$ $k=10$, $\sin(\theta+63\pi/6)=\sin(\theta+60\pi/6+3\pi/6)=\sin(\theta+\pi/2)=\cos\theta$ $k=11$, $\sin(\theta+70\pi/6)=\sin(\theta+72\pi/6-2\pi/6)=\sin(\theta+2\pi/3-\pi)=-\sin(\theta+2\pi/3)$ $k=12$, $\sin(\theta+77\pi/6)=\sin(\theta+72\pi/6+5\pi/6)=\sin(\theta+3\pi/2-2\pi/3)=-\cos(\theta-2\pi/3)$ The output signals of, from the left side, $1^{st}$ (k=1) first pattern, $4^{th}$ (k=4) first pattern, $9^{th}$ (k=9) first pattern and $7^{th}$ (k=7) first pattern may be sequentially illustrated in the following manner:

①A $\sin\theta + v_{off} + e(\theta) + n_1$
②A $\sin(\theta-\pi/2) + v_{off+e(\theta-\pi/2)} + n_2$
③A $\sin(\theta-2\pi/3) + v_{off+e(\theta-2\pi/3)} + n_3$
④A $\sin(\theta-\pi) + v_{off} + e(\theta-\pi) + n_4$ At this time, the $4^{th}$ harmonic wave can be removed because the periodic error becomes $e(\theta)-e(\theta-\pi/2)$ by deduction of ① and ②. The periodic error becomes $e(\theta)-e(\theta-2\pi/3)$ by deduction of ① and ③ to remove the $3^{rd}$ harmonic wave. The periodic error becomes $e(\theta)-e(\theta-\pi)$ by deduction of ① and ④ to remove the $2^{nd}$ harmonic wave.

In this manner, the $6^{th}$ harmonic wave can be removed by deduction of $1^{st}$ (K=1) first pattern and $11^{th}$ (k=11) first pattern, and the $12^{th}$ harmonic wave can be removed by deduction of the $1^{st}$ (k=1) first pattern and $6^{th}$ (k=6) first pattern. That is, if organized, in an optical encoder including a scale where a first light receiving part formed with a plurality of first patterns and a second pattern having a same width as that of the first pattern that moves relative to the light receiving part are formed at a same interval as the width, when the first pattern is aligned at an interval where each width of the first patterns is divided by 6, at least $2^{nd}$, $3^{rd}$ and $4^{th}$ harmonic waves can be removed.

That is, the $2^{nd}$, $3^{rd}$ and $4^{th}$ harmonic waves can be removed by performing deduction by selection of an adequate first pattern in the computation part to allow all intervals of first patterns to be L/6. Furthermore, the white noise can be also reduced in this process. Still furthermore, much more number of first patterns can be aligned on a predetermined area over a case where a same interval as the width of the first pattern is formed, because the interval between the first patterns is narrowly formed than the width of the first pattern.

Thus, utilization ratio of light receiving area can be enhanced because more signals each having a different phase can be extracted from a predetermined area. For example, if N=6, the utilization ratio of light receiving area is 1.3 times higher than a method where the interval and width are same. Furthermore, influence to random noise is robust because much more number of signals is extracted for use in removal of harmonic waves. Meantime, if the interval of the first patterns is L/6, it is possible to remove $6^{th}$ and $12^{th}$ harmonic waves in addition to removal of $2^{nd}$, $3^{rd}$ and $4^{th}$ harmonic waves. Furthermore, computation can be performed for obtaining a desired amplitude as division by 2 for adjustment of signal amplitude The computation part (160) removes the harmonic waves by deduction of selected two output signal of the first pattern. The reason of division by 2 is related to the amplitude, where the process of division by 2 may be omitted if an object is solely for removal of harmonic waves, or may be replaced by a process of division by other values. The two first patterns selected from removal of i harmonic wave among the harmonic waves (i is a natural number of more than 2) have a phase difference of 2π/i.

The harmonic waves removed according to N that determines an interval of the first pattern may be defined as follows:

If N=2, d=L/2, M=4, D=6L, and $2^{nd}$ and $4^{th}$ harmonic waves can be removed.

If N=3, d=L/3, M=6, D=8L, and $3^{rd}$ harmonic wave can be removed.

If N=4, d=L/4, M=8, D=10L, and $2^{nd}$, $4^{th}$ and $8^{th}$ harmonic waves can be removed.

If N=5, d=L/5, M=10, D=12L, and $5^{th}$ harmonic wave can be removed.

If N=6, d=L/6, M=12, D=14L, and $2^{nd}$, $3^{rd}$, $4^{th}$, $6^{th}$, and $12^{th}$ harmonic waves can be removed.

Now, if generalized, if N is an even number when d=L/N, harmonic waves corresponding to multiple of 2N can be removed. If N is an odd number when d=L/N, harmonic waves corresponding to multiple of N can be removed. If N is an even number, that is, if N=2j(j is a natural number), the removable harmonic waves increase, such that the interval of first patterns is preferably the width L of the first pattern divided by N=2j(j is a natural number).

FIGS. 7 to 10 are schematic views illustrating a harmonic wave removal method when d=L/2. Of course, there may be various other methods capable of removing harmonic waves. The solid line shows an object to be deducted, and a dotted line shows a deduction object. In the following description, the offset error $v_{off}$, the periodic error $e(\theta)$ and white noise $n_i$ are not shown for convenience sake.

Figure 7:
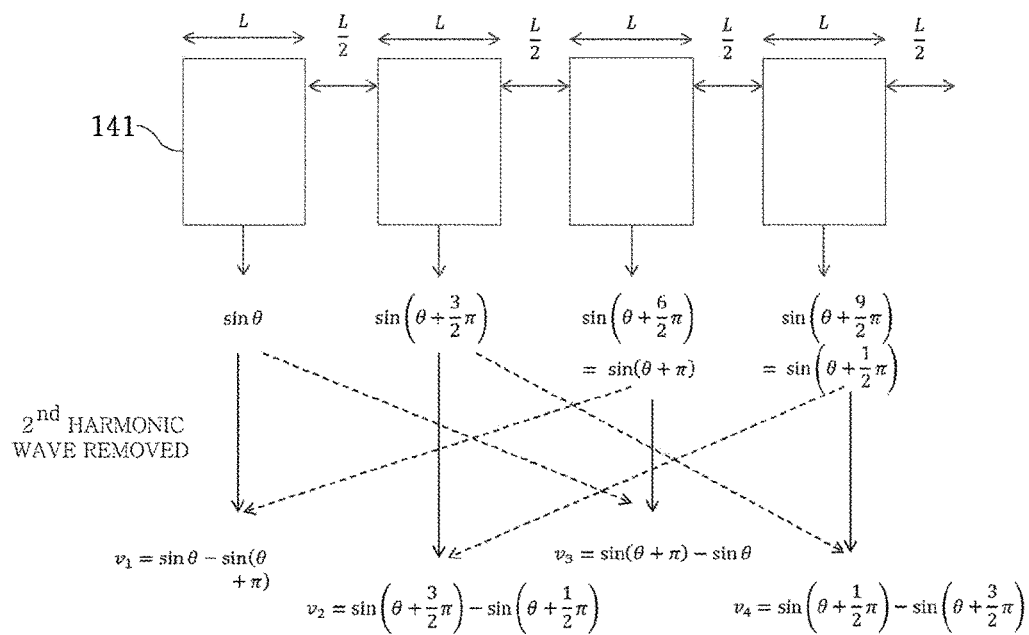
FIG. 7 is a schematic view illustrating an example of removing $2^{nd}$ harmonic wave by allowing an interval of a first pattern at L/2 in an optical encoder according to the present disclosure.
Figure 8:
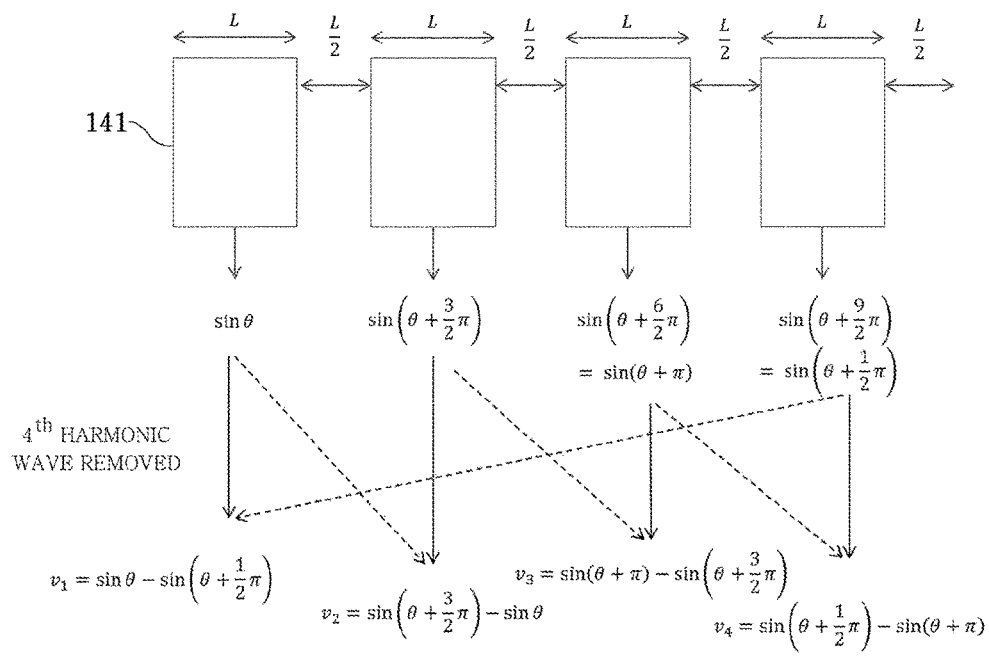
FIG. 8 is a schematic view illustrating an example of removing 4th harmonic wave by allowing an interval of a first pattern at L/2 in an optical encoder according to the present disclosure.

FIG. 7 illustrates computation of removing $2^{nd}$ harmonic wave, and FIG. 8 illustrates computation of removing 4th harmonic wave.

In order to remove the $2^{nd}$ harmonic wave, a first pattern having a $2\pi/2$ phase difference is selected and deducted. For example, For example, when using sin θ of $1^{st}$ first pattern in FIG. 7 as a reference signal, the $3^{rd}$ first pattern from which a signal of $2\pi/2$ phase difference is outputted is selected and deducted from the $1^{st}$ first pattern. If when using a signal of $2^{nd}$ first pattern, i.e., $\sin(\theta+3\pi/2)$ as a reference signal, $\sin(\theta+3\pi/2)$ is deducted from a signal of $4^{th}$ first pattern having $\sin(\theta+\pi/2)$ of $2\pi/2$ phase difference.

FIG. 7 is a schematic view illustrating an example of removing $2^{nd}$ harmonic wave by allowing an interval of a first pattern at L/2 in an optical encoder according to the present disclosure, where each deduction result is shown by $v_1$ to $v_4$ to be used for later angle computation. The $v_1$ to $v_4$ in FIG. 7 are signals removed of harmonic waves, whereby error caused by second harmonic wave can be naturally removed.

In order to remove $4^{th}$ harmonic wave, the first pattern having $2\pi/4$ phase difference is selected and deducted. In order to satisfy this condition, as illustrated in FIG. 8, the computation part selects the $4^{th}$ first pattern relative to the $1^{st}$ first pattern and does the deduction to generate $v_1$. The computation part selects the $1^{st}$ first pattern relative to the $2^{nd}$ first pattern and does the deduction to generate $v_2$. The computation part selects the $2^{nd}$ first pattern relative to the $4^{th}$ first pattern and does the deduction to generate $v_3$. The computation part selects the $3^{rd}$ first pattern relative to the $4^{th}$ first pattern and does the deduction to generate $v_4$. The $v_1$ to $v_4$ thus generated are in the state of $4^{th}$ harmonic wave being removed, such that an angle computation result using $v_1$ to $v_4$ can be naturally ruled out of errors caused by $4^{th}$ harmonic wave.

Figure 9:
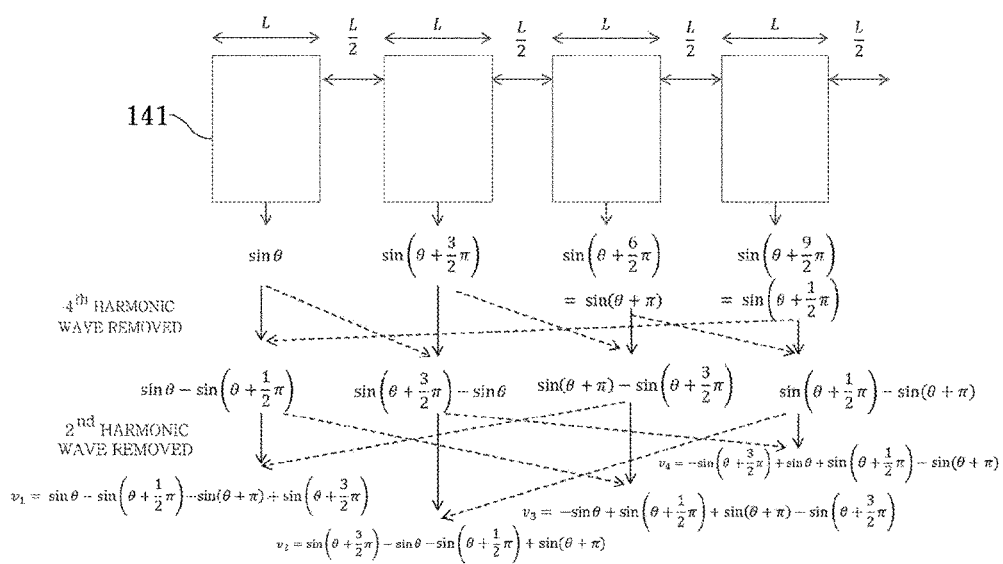
FIG. 9 is a schematic view illustrating an example of removing $2^{nd}$ and 4th harmonic waves by allowing an interval of a first pattern at L/2 in an optical encoder according to the present disclosure.
Figure 10:
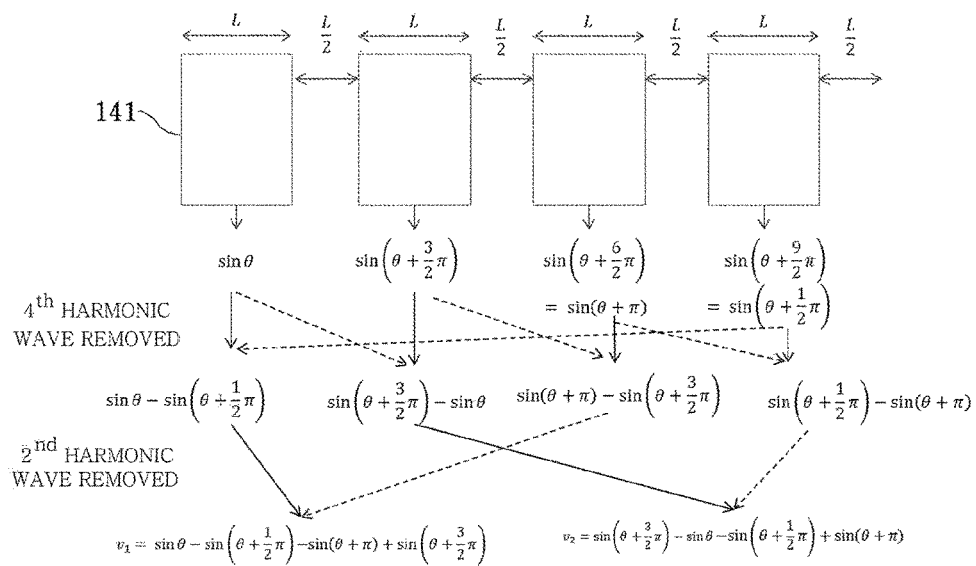
FIG. 10 is a schematic view illustrating another example of removing $2^{nd}$ and 4th harmonic waves by allowing an interval of a first pattern at L/2 in an optical encoder according to the present disclosure.

FIGS. 9 and 10 illustrate a computation in which $4^{th}$ harmonic wave is removed, and $2^{nd}$ harmonic wave is removed using a result of removal of $4^{th}$ harmonic wave.

Referring to FIG. 9, first, in order to remove $4^{th}$ harmonic wave, another first pattern having $2\pi/4$ phase difference is selected and deducted relative to each first pattern. At this time, a total of four result values removed of $4^{th}$ harmonic wave is calculated, and based on each result value, another result value having $2\pi/2$ phase difference is selected and deducted to remove $2^{nd}$ harmonic wave. As the $4^{th}$ harmonic wave, a removal object of $2^{nd}$ harmonic wave, is removed, it is possible to finally obtain $v_1$ to $v_4$ removed of $2^{nd}$ and $4^{th}$ harmonic waves.

For example, when a signal of $1^{st}$ first pattern and a signal of $4^{th}$ first pattern are deducted, a signal of $\sin\theta-\sin(\theta+\pi/2)$ removed of $4^{th}$ harmonic wave can be calculated. The signal thus calculated means sin θ removed of $4^{th}$ harmonic wave.

When a signal of $3^{rd}$ first pattern and a signal of $2^{nd}$ first pattern are deducted, a signal of $\sin(\theta+\pi)-\sin(\theta+3\pi/2)$ removed of $4^{th}$ harmonic wave can be calculated. The signal thus calculated means $\sin(\theta+\pi)$ removed of $4^{th}$ harmonic wave.

Thereafter, when sin θ removed of $4^{th}$ harmonic wave and $\sin(\theta+\pi)$ removed of $4^{th}$ harmonic wave are deducted, a signal of $v_1=\sin\theta-\sin(\theta+\pi/2)-\sin(\theta+\pi)+\sin(\theta+3\pi/2)$ removed of $2^{nd}$ harmonic wave can be calculated. In this way, $v_2$ to $v_4$ can be also calculated.

Signals $v_1$ to $v_4$ are generated for angle computation in the foregoing. However, two or more signals are sufficient for angle computation. Thus, it is preferable to reduce a load of the computation part by calculating two signals only, if possible.

For example, angle computation is possible using only two signals of $v_1$ and $v_2$ as illustrated in FIG. 10. When $4^{th}$ harmonic wave-removed signals ①, ②, ③, ④ are defined as below, and $2^{nd}$ harmonic wave is removed ($v_1$) by using ①, ③, and $2^{nd}$ harmonic wave is removed ($v_2$) using ②, ④, two signals of $v_1$, $v_2$ can be secured.

$\sin\theta-\sin(\theta+\pi/2)$      ①

$\sin(\theta+3\pi/2)-\sin\theta$      ②

$\sin(\theta+\pi)-\sin(\theta+3\pi/2)$      ③

$\sin(\theta+\pi/2)-\sin(\theta+\pi)$      ④

Figure 11:
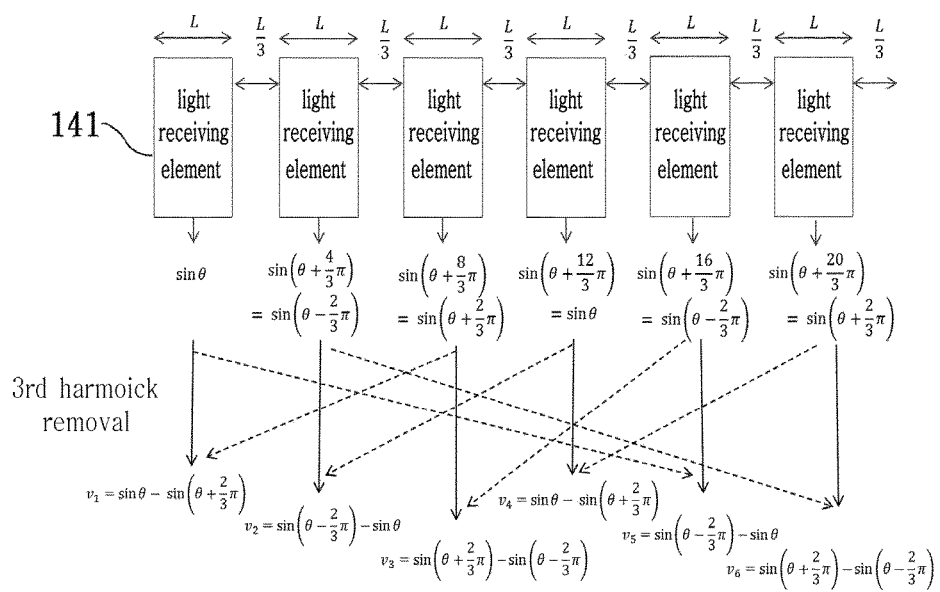
FIG. 11 is a schematic view illustrating an example of removing $3^{rd}$ harmonic wave by allowing an interval of a first pattern at L/3 in an optical encoder according to the present disclosure.

FIG. 11 is a schematic view illustrating an example of removing $3^{rd}$ harmonic wave by allowing an interval of a first pattern at L/3 (d=L/3) in an optical encoder according to the present disclosure, whereby it can be noted that $3^{rd}$ harmonic wave has been removed.

In order to remove $3^{rd}$ harmonic wave, a signal of $2\pi/3$ phase difference is deducted. For example, when a signal of $\sin(\theta+2\pi/3)$ of $3^{rd}$ first pattern is deducted in respect to signal sin θ of the $1^{st}$ first pattern, a signal $v_1$ removed of $3^{rd}$ harmonic wave can be obtained. In this way, signals of $v_2$ to $v_6$ are obtained for use in angle computation. It should be also apparent that only two signals out of signals of $v_1$ to $v_6$ may be calculated to perform the angle computation.

Figure 12:
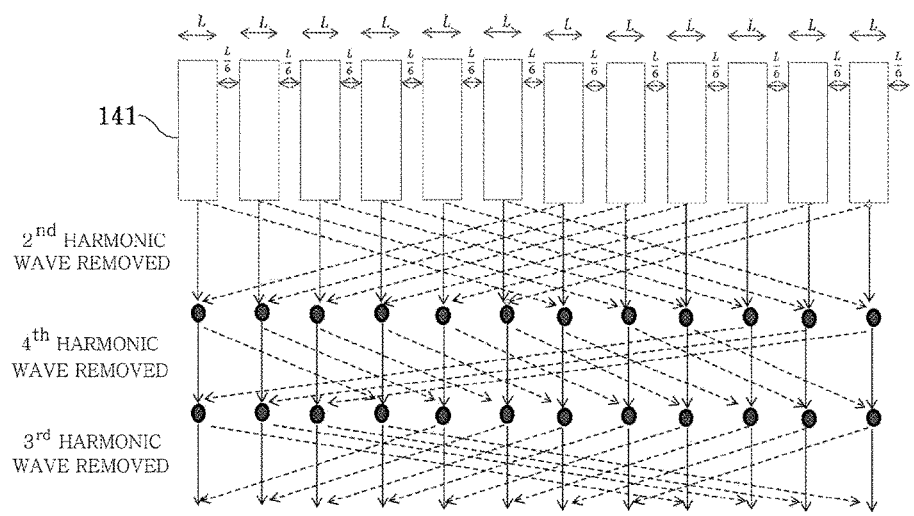
FIG. 12 is a schematic view illustrating an example of removing $2^{nd}$, $3^{th}$ and 4th harmonic waves by allowing an interval of a first pattern at L/6 in an optical encoder according to the present disclosure.
Figure 13:
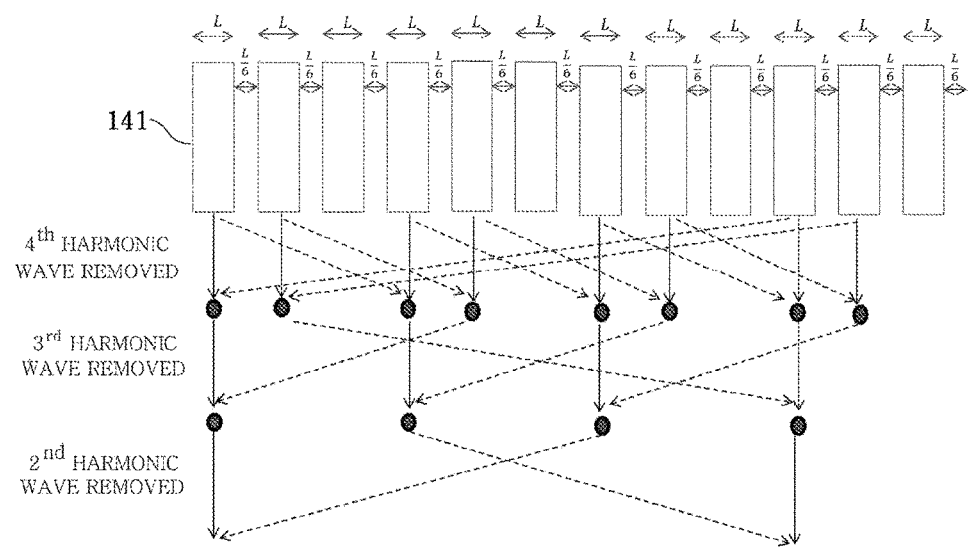
FIG. 13 is a schematic view illustrating another example of removing $2^{nd}$, $3^{th}$ and 4th harmonic waves by allowing an interval of a first pattern at L/6 in an optical encoder according to the present disclosure.
Figure 14:
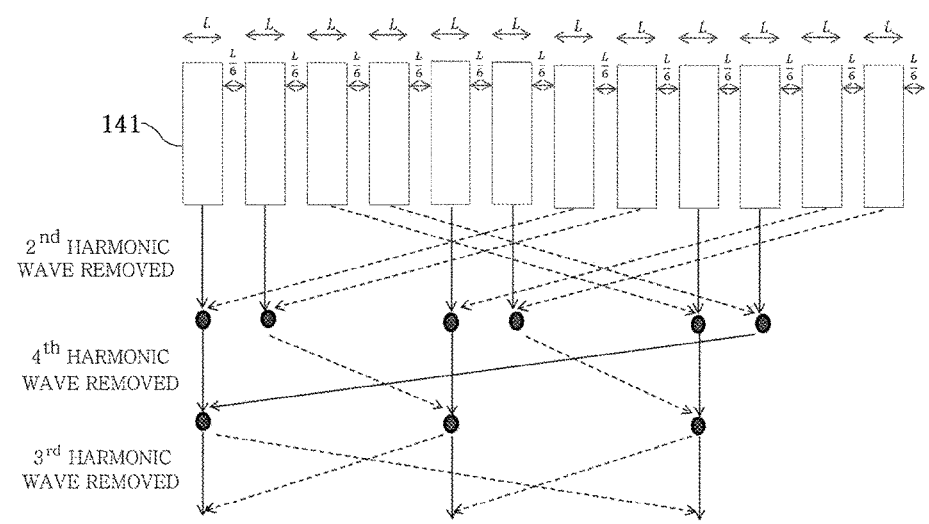
FIG. 14 is a schematic view illustrating still another example of removing $2^{nd}$, $3^{th}$ and 4th harmonic waves by allowing an interval of a first pattern at L/6 in an optical encoder according to the present disclosure.

FIGS. 12, 13 and 14 are schematic views illustrating an example of removing harmonic waves by allowing an interval of a first pattern at L/6 (d=L/6) in an optical encoder according to the present disclosure, where FIG. 12 illustrates that $2^{nd}$ harmonic wave is removed from all outputs of the first pattern, and $4^{th}$ harmonic wave is removed using all the outputs as a result thereof. Thereafter, $3^{rd}$ harmonic wave is removed using all the results removed of $4^{th}$ harmonic wave.

A signal of each first pattern may be sequentially as follows:

$\sin\theta$      ①

$\sin(\theta+7\pi/6)=\sin(\theta-5\pi/6)$      ②

$\sin(\theta+14\pi/6)=\sin(\theta+\pi/3)$      ③

$\sin(\theta+21\pi/6)=\sin(\theta-\pi/2)$      ④

$\sin(\theta+28\pi/6)=\sin(\theta+2\pi/3)$      ⑤

$\sin(\theta+35\pi/6)=\sin(\theta-\pi/6)$      ⑥

$\sin(\theta+42\pi/6)=\sin(\theta-\pi)$      ⑦

$\sin(\theta+49\pi/6)=\sin(\theta+\pi/6)$      ⑧

$\sin(\theta+56\pi/6)=\sin(\theta-2\pi/3)$      ⑨

$\sin(\theta+63\pi/6)=\sin(\theta+\pi/2)$      ⑩

$\sin(\theta+70\pi/6)=\sin(\theta-\pi/3)$      ⑪

$\sin(\theta+77\pi/6)=\sin(\theta+5\pi/6)$      ⑫

Under these states, exemplary process of removing 2nd, $4^{th}$ and $3^{rd}$ harmonic waves in that order is provided as under: In order to remove $2^{nd}$ harmonic wave, deduction is made between signals having $2\pi/2$ phase difference.

①-⑦=$\sin\theta-\sin(\theta-\pi)$

②-⑧=$\sin(\geq-5\pi/6)-\sin(\theta+\pi/6)$

⑤-⑪=$\sin(\theta+2\pi/3)-\sin(\theta-\pi/3)$

⑩-④=$\sin(\theta+\pi/2)-\sin(\theta-\pi/2)$

As a result of computation, $2^{nd}$ harmonic wave-removed sin θ, sin(θ−5π/6), sin(θ+2π/3), sin(θ+π/2) signals are obtained.

In order to remove $4^{th}$ harmonic wave from the above $2^{nd}$ harmonic wave-removed result, deduction is made between signals having 2π/4 phase difference.

(①−⑦)−(⑩−④)=(sin θ−sin(θ−π))−(sin(θ+π/2)−sin(θ−π/2))

(⑤−⑪)−(②−⑧)=(sin(θ+2π/3)−sin(θ−π/3))−(sin(θ−5π/6)−sin(θ+π/6))

where, sin(θ−5π/6)=sin(θ+2π/3+π/2)=sin(θ+7π/6)
=sin(θ+2π−5π/6).

The $4^{th}$ harmonic wave is removed from a signal removed of $2^{nd}$ harmonic wave to resultantly obtain sin θ signal removed of $2^{nd}$ harmonic wave and $4^{th}$ harmonic wave.

In order to remove $3^{rd}$ harmonic wave from the above result removed of the $2^{nd}$ harmonic wave and $4^{th}$ harmonic wave, signals having 2π/3 phase difference are deducted.

((①−⑦)−(⑩−④))−((⑤−⑪)−(②−⑧))=((sin θ−sin(θ−π))−(sin(θ+π/2)−sin(θ−π/2)))−((sin(θ+2π/3)−sin(θ−π/3))−(sin(θ−5π/6)−sin(θ+π/6)))

Because $3^{rd}$ harmonic wave is removed from the signals removed of the $2^{nd}$ harmonic wave and $4^{th}$ harmonic wave, sin θ signals removed of $2^{nd}$, $3^{rd}$ and $4^{th}$ harmonic waves can be naturally obtained. In this way, each signal of first pattern removed of $2^{nd}$, $3^{rd}$ and $4^{th}$ harmonic waves can be obtained.

FIGS. 13 and 14 illustrate exemplary configurations where only two and three signals used for angle computation are obtained, where FIG. 13 illustrates a method of removing 4th, 3rd and $2^{nd}$ harmonic waves in that order, and FIG. 14 illustrates a method of removing $2^{nd}$, $3^{rd}$ and $4^{th}$ harmonic waves in that order. Of course, it should be apparent that there are various other methods of removing harmonic waves. FIG. 13 will be first discussed. In order to remove the $4^{th}$ harmonic waver, signals having 2π/4 phase difference are deducted.

①−⑩=sin θ−sin(θ+π/2)

⑤−②=sin(θ+2π/3)−sin(θ−5π/6)

⑦−④=sin(θ−π)−sin(θ−π/2)

⑪−⑧=sin(θ−π/3)−sin(θ+π/6)

where, sin(θ+π/6)=sin(θ−π/3+π/2).

Next, in order to remove the $3^{rd}$ harmonic wave, signals having 2π/3 phase difference are deducted from a result of the above computation.

(①−⑩)−(⑤−②)=(sin θ−sin(θ+π/2))−(sin(θ+2π/3)−sin(θ−5π/6))

(⑦−④)−(⑪−⑧)=(sin(θ−π)−sin(θ−π/2))−(sin(θ−π/3)−sin(θ+π/6))

Next, in order to remove the $2^{nd}$ wave, signals having 2π/2 phase difference are deducted.

((①−⑩)−(⑤−②))−((⑦−④)−(⑪−⑧))=((sin θ−sin(θ+π/2))−(sin(θ+2π/3)−sin(θ−5π/6)))−((sin(θ−π)−sin(θ−π/2))−(sin(θ−π/3)−sin(θ+π/6)))

In this way, two final signals removed of $2^{nd}$, $3^{rd}$ and $4^{th}$ harmonic waves based on signals of $1^{st}$ and $10^{th}$ first patterns can be obtained. At this time, the reference signal may be arbitrarily selected.

FIG. 14 is such that according to the process discussed in FIG. 12, signals of $1^{st}$ first pattern removed of $2^{nd}$, $3^{rd}$ and $4^{th}$ harmonic waves are obtained, and in the same way, signals of $5^{th}$ and $9^{th}$ first patterns are obtained. Angles can be calculated using all the three signals thus obtained, and angles may be calculated using only any two signals.

The computation part (160) may remove qth harmonic wave (q is a natural number) using an output signal of the first pattern as in FIGS. 13 and 14, for example, and q+1th harmonic wave can be removed using a process signal removed of qth harmonic wave.

Although two signals having 2π/I phase difference are selected and computed by the first pattern in order to remove i harmonic wave according to FIGS. 7 and 8, FIG. 14 is such that an output signal of the first pattern is used only for removal of $2^{nd}$ harmonic wave which is $1^{st}$ harmonic wave, for example, and a signal removed of $2^{nd}$ harmonic wave which is a $1^{st}$ harmonic wave is used for removal of $4^{th}$ harmonic wave which is the $2^{nd}$ harmonic wave. Likewise, a signal removed of $4^{th}$ harmonic wave which is the $2^{nd}$ harmonic wave is used for removal of $3^{rd}$ harmonic wave which the $3^{rd}$ harmonic wave. At this time, the $q^{th}$ harmonic wave shows a case of order in which a harmonic wave order removable at a relevant interval is sorted in one of ascending order, descending order and random order.

As a result, the computation part (160) may be so formed as to allow only a means for removing $2^{nd}$ harmonic wave to receive an output data of the first pattern (141), whereby circuit can be simplified. Furthermore, harmonic waves of a plurality of orders can be also removed at the same time.

Although the above explanations have illustrated examples of sinusoidal waves, various other periodic signals including triangular signals may be applied. To sum up, the optical encoder according to the present disclosure may include a light receiving part and a scale respectively formed with first and second patterns configured to output periodic signals, and at this time, the first pattern is aligned in plural manner, and two first patterns selected to remove i harmonic wave included in the periodic signal may have a phase difference in which a period of the periodic signal is divided by i.

Furthermore, the optical encoder according to the present disclosure may include a light receiving part and a scale respectively formed with first and second patterns configured to output periodic signals, and at this time, the first pattern, in order to remove i harmonic wave included in the periodic signal, may be aligned at an interval in which a width L of the first pattern is divided by i, or divided by i's multiple. For example, in order to remove $2^{nd}$ harmonic wave, the first pattern may be aligned at an interval in which width of the first pattern is divided by 2 or divided by 2' multiple. The computation part (160) may calculate a relative amount of movement using a signal removed of harmonic wave after performing a computation of removing a desired harmonic wave.

First, the first pattern is aligned at an interval in which width of the first pattern is divided by 2 or 2's multiple in order to remove $2^{nd}$ harmonic wave. The computation part (160) may calculate a relative amount of movement using a signal removed of harmonic wave after performing a computation removing a desired harmonic wave. First, A sin θ and A cos θ are obtained using the following Equation 4.

[Equation 4]

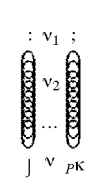

where, $v_1, v_2, \ldots, v_P$ are signals removed of harmonic waves, $M_P$ is a matrix converting sin and cos to signals, and $M_P^T$ is a transposed matrix of $M_P$.

For example, final outputs removed of harmonic waves in FIG. 9 are four of $v_1 \sim v_4$. Thus, P=4, and $[v_1\ v_2\ v_3\ v_4]^T$ may be expressed by the following Equation 5, where it is assumed that A=1.

$$\begin{bmatrix} v_1 \\ v_2 \\ v_3 \\ v_4 \end{bmatrix} = \begin{bmatrix} 1 & -1 & -1 & 1 \\ -1 & -1 & 1 & 1 \\ -1 & 1 & 1 & -1 \\ 1 & 1 & -1 & -1 \end{bmatrix} \begin{bmatrix} \sin\theta \\ \sin(\theta + \tfrac{1}{2}\pi) \\ \sin(\theta + \pi) \\ \sin(\theta + 3/2\,\pi) \end{bmatrix} =$$
[Equation 5]

$$\begin{bmatrix} 1 & -1 & -1 & 1 \\ -1 & -1 & 1 & 1 \\ -1 & 1 & 1 & -1 \\ 1 & 1 & -1 & -1 \end{bmatrix} \begin{bmatrix} 1 & 0 \\ 0 & 1 \\ -1 & 0 \\ 0 & -1 \end{bmatrix} \begin{bmatrix} \sin\theta \\ \cos\theta \end{bmatrix} = \begin{bmatrix} 2 & -2 \\ -2 & -2 \\ -2 & 2 \\ 2 & 2 \end{bmatrix} \begin{bmatrix} \sin\theta \\ \cos\theta \end{bmatrix}$$

where, $\begin{bmatrix} v_1 \\ v_2 \\ \ldots \\ v_P \end{bmatrix} = M_P \begin{bmatrix} \sin\theta \\ \cos\theta \end{bmatrix}$ is $M_P = \begin{bmatrix} 2 & -2 \\ -2 & -2 \\ -2 & 2 \\ 2 & 2 \end{bmatrix}$.

Thus, a final equation may be expressed by the following Equation 6.

$$(M^T_P M_P)^{-1} M^T_P = \frac{1}{8}\begin{bmatrix} 1 & -1 & -1 & 1 \\ -1 & -1 & 1 & 1 \end{bmatrix}.$$
[Equation 6]

$$\begin{bmatrix} \sin\theta \\ \cos\theta \end{bmatrix} = \frac{1}{8}\begin{bmatrix} 1 & -1 & -1 & 1 \\ -1 & -1 & 1 & 1 \end{bmatrix} \begin{bmatrix} v_1 \\ v_2 \\ v_3 \\ v_4 \end{bmatrix}$$

The final outputs removed of harmonic waves in FIG. 10 are two of $v_1$ and $v_2$.

Thus, P=2, and $[v_1\ v_2]^T$ may be expressed by the following Equation 7, where it is assumed that A=1.

$$\begin{bmatrix} v_1 \\ v_2 \end{bmatrix} = \begin{bmatrix} 1 & -1 & -1 & 1 \\ -1 & -1 & 1 & 1 \end{bmatrix} \begin{bmatrix} \sin\theta \\ \sin(\theta + \tfrac{1}{2}\pi) \\ \sin(\theta + \pi) \\ \sin(\theta + 3/2\,\pi) \end{bmatrix} =$$
[Equation 7]

$$\begin{bmatrix} 1 & -1 & -1 & 1 \\ -1 & -1 & 1 & 1 \end{bmatrix} \begin{bmatrix} 1 & 0 \\ 0 & 1 \\ -1 & 0 \\ 0 & -1 \end{bmatrix} \begin{bmatrix} \sin\theta \\ \cos\theta \end{bmatrix} = \begin{bmatrix} 2 & -2 \\ -2 & -2 \end{bmatrix} \begin{bmatrix} \sin\theta \\ \cos\theta \end{bmatrix}$$

where, $\begin{bmatrix} v_1 \\ v_2 \\ \ldots \\ v_P \end{bmatrix} = M_P \begin{bmatrix} \sin\theta \\ \cos\theta \end{bmatrix}$ is $M_P = \begin{bmatrix} 2 & -2 \\ -2 & -2 \end{bmatrix}$.

Thus, a final expression may be expressed by the following Equation 8.

$$(M_P^T M_P)^{-1} M_P^T = \frac{1}{4}\begin{bmatrix} 1 & -1 \\ -1 & -1 \end{bmatrix}.$$

$$\begin{bmatrix} \sin\theta \\ \cos\theta \end{bmatrix} = \frac{1}{4}\begin{bmatrix} 1 & -1 \\ -1 & -1 \end{bmatrix}\begin{bmatrix} v_1 \\ v_2 \end{bmatrix}$$
[Equation 8]

FIG. 9 may be also applied with two signals arbitrarily selected from the obtained $v_1 \sim v_4$. Thereafter, an angle which is a relative amount of movement may be calculated from the following Equation 9.

$$\theta = \tan^{-1}\frac{A\sin\theta}{A\cos\theta}$$
[Equation 9]

Figure 15:
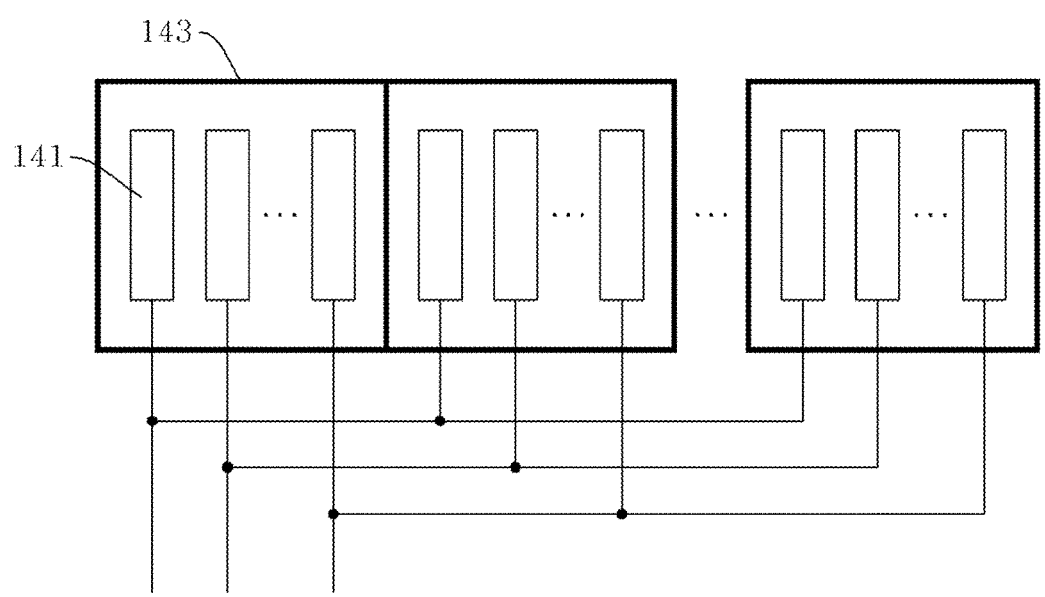
FIG. 15 is a schematic view illustrating an aligned status of patterns in an optical encoder according to another exemplary embodiment of the present disclosure.

FIG. 15 is a schematic view illustrating an aligned state of patterns in an optical encoder according to another exemplary embodiment of the present disclosure.

Referring to FIG. 15, an area including the continued 2N numbered first pattern (141) is defined as a unit pattern group (143), where a plurality of unit pattern groups is serially aligned. At this time, first patterns having a same phase in each unit pattern group may be aligned in parallel. According to the foregoing, signals that are outputted are not signals outputted from one light receiving part, but a sum of signals or an average of signals outputted from parallel-connected plurality of light receiving parts. Thus, operation can be reliably performed even with a small amount of light, and an error of output signal can be alleviated even if errors occur on some of the light receiving parts.

To wrap up, the optical encoder according to the present disclosure may include a computation part in which a unit pattern group continuously formed with first patterns is aligned in plural, first patterns which have a same phase in each unit pattern group are connected in parallel, and harmonic waves can be removed using the output signals of the first patterns.

Meantime, although the present disclosure has been described in detail with reference to the foregoing embodiments and advantages, many alternatives, modifications, and variations will be apparent to those skilled in the art within the metes and bounds of the claims. Therefore, it should be understood that the above-described embodiments are not limited by any of the details of the foregoing description, unless otherwise specified, but rather should be construed broadly within the scope as defined in the appended claims

INDUSTRIAL APPLICABILITY

The present disclosure may be applicable to an optical encoder. Particularly, the present disclosure may be preferably applicable to a high precision optical encoder that requires removal of harmonic waves.

What is claimed is:

1. An optical encoder, the optical encoder comprising:
   first patterns formed on a scale, wherein adjacent patterns of the first patterns define a first interval each to the other;
   second patterns formed on a light receiving part, wherein adjacent patterns of the second patterns define a second interval each to the other,
   wherein the scale moves relatively with respect to the light receiving part and a light transmission part,
   wherein intervals defining the first interval or intervals defining the second interval are the same, and the first and second intervals are configured to remove at least a $2^{nd}$ harmonic wave and a $4^{th}$ harmonic wave, wherein the first interval is the same as the second interval, and a width of the first pattern is equal to a width of the second pattern.

2. The optical encoder of claim 1, wherein the first interval defines an interval 'd' that is smaller than a width 'L' of each pattern of the first patterns.

3. The optical encoder of claim 1, wherein the first interval has a value in which a width 'L' of each pattern of the first patterns is divided by N, wherein N is a natural number equal to or greater than 2.

4. The optical encoder of claim 3, wherein a number 'M' of patterns in the first patterns is at least 2N.

5. The optical encoder of claim 1, wherein the first interval defining an interval 'd' has a value in which a width 'L' of the first pattern is divided by N=2j, wherein j is a natural number.

6. The optical encoder of claim 5, wherein a number 'M' of patterns in the first patterns is at least 2N, and wherein an order of harmonic wave corresponding to 2N is removed.

7. The optical encoder of claim 1, wherein an alignment length 'D' of the first patterns is at least M (L+d), where the number of the first pattern is M, the first interval defines an interval d and a width of each pattern of the first patterns is L.

8. The optical encoder of claim 7, wherein a plurality of unit pattern groups including the continuous M number of first pattern is aligned.

9. The optical encoder of claim 8, wherein the first pattern of same phase in each unit pattern group is connected in parallel.

10. The optical encoder of claim 1, further comprising a computation part configured to remove harmonic wave by subtracting an output signal of selected two first patterns.

11. The optical encoder of claim 1, wherein two first patterns selected for removing an ith harmonic wave, wherein i is a natural number of more than 2 among the harmonic waves having a phase difference of $2\pi/i$.

12. The optical encoder of claim 1, further comprising a computation part configured to remove a qth harmonic wave, q being a natural number, using the output signal of the first pattern, and a q+1th harmonic wave using a q+1th harmonic wave-removed processing signal.

13. The optical encoder of claim 1, further comprising a computation part configured to remove harmonic wave using the output signal of the first pattern connected in parallel, wherein a unit pattern group formed with continuous first pattern is aligned in plural number, and the first pattern which is of the same phase in each unit pattern group is connected in parallel.

14. The optical encoder of claim 1, wherein the first interval and the second interval are aligned when the width of the first pattern is divided by 6 in order to remove at least 2nd, 3rd and 4th harmonic waves.

* * * * *